J. POSTLE.
WIRE GATE FASTENER.
APPLICATION FILED JULY 21, 1908.
916,368.
Patented Mar. 23, 1909.
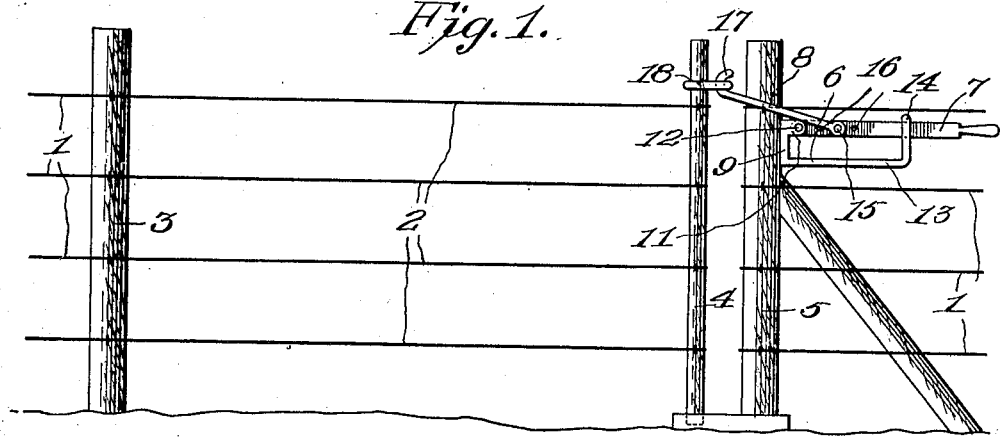
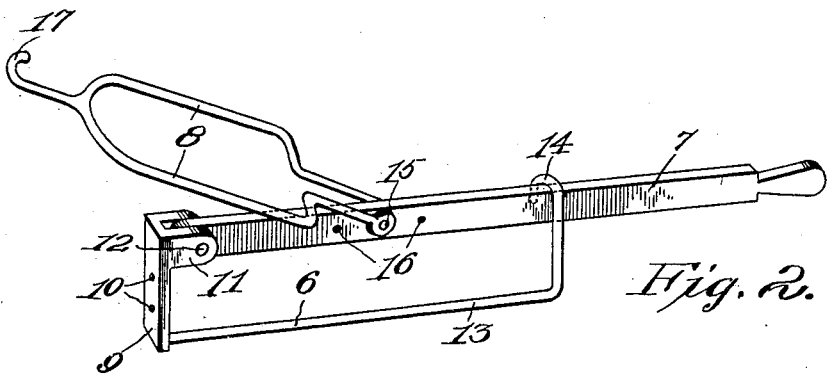
Witnesses
James F. Crown
J. M. Terry
Inventor
John Postle
By Watson E. Coleman
Attorney
THE NORRIS PETERS CO., WASHINGTON, D. C.

UNITED STATES PATENT OFFICE.

JOHN POSTLE, OF WINONA, NORTH DAKOTA.

WIRE-GATE FASTENER.

No. 916,368.     Specification of Letters Patent.     Patented March 23, 1909.

Application filed July 21, 1908. Serial No. 444,634.

*To all whom it may concern:*

Be it known that I, JOHN POSTLE, a citizen of the United States, residing at Winona, in the county of Emmons and State of North Dakota, have invented certain new and useful Improvements in Wire-Gate Fasteners, of which the following is a specification, reference being had to the accompanying drawings.

This invention relates to an improved fastening device for wire gates and consists of the novel features of construction and the combination and arrangement of parts hereinafter fully described and claimed.

The object of the invention is to provide a simple and inexpensive device of this character by means of which a gate made of barb wire or the like may be quickly and effectively stretched and retained in its closed position.

The above and other objects of the invention are attained in its preferred embodiments illustrated in the accompanying drawings, in which—

Figure 1 is a side elevation of a wire gate showing the application of the improved stretching and fastening device; and Fig. 2 is a perspective view of the device removed from the post.

In the drawings 1 denotes a portion of a fence, 2 a flexible gate composed of a plurality of strands of barb wire or the like fixed to a fence post 3 and having their free ends attached to a gate upright 4.

5 denotes a fastening post to which the upright or end bar 4 of the gate is secured by the improved stretching and fastening device, which latter consists of an attaching member 6, an operating lever 7 and a connecting link or loop 8. The attaching member 6 shown in Figs. 1 and 2 of the drawings comprises a plate or bar 9 adapted to be arranged vertically upon the side of the post 5 and having apertures 10 to receive screws, nails, or similar fastenings. At the upper end of the plate or member 9 is a bearing lug 11 to which is pivoted at 12 one end of the stretching or operating lever 7. Projecting horizontally from the lower end of the plate or member 9 is an arm 13, the outer end of which is bent upwardly at right angles and then upon itself to provide a downwardly projecting keeper hook 14 to receive the free or handle end of the lever 7. The latter, as shown in the drawing, is straight and has the connecting link or member 8 pivoted to it intermediate its ends, as shown at 15. This connection is preferably made adjustable by forming in the lever 7 a longitudinal series of apertures 16 any one of which may receive the pivot bolt 15. The link 8 is in the form of an open loop adapted to receive the post 5 and having one end formed with an eye to receive the pivot 15 and its other end formed with a hook 17 to engage a loop or eye 18 arranged upon the upper portion of the gate upright 4.

In operation, when the lever 7 is in an upright position, the eye or loop 18 may be readily engaged with the hook 17 and when the handle end of said lever is swung downwardly the gate 2 will be stretched and may be secured in such stretched position by placing said lever in the keeper hook 14.

It will be seen that this device provides an exceedingly simple stretching and fastening device having a gate of this character and one which is inexpensive in construction, easy to apply and to open and close and effective in accomplishing its intended purpose.

Having thus described the invention what is claimed is:

The combination with a fence having a post and a gate having an upright, of a loop upon the upright, an attaching member or bracket comprising a vertically disposed plate secured upon the post and having at its upper end spaced bearing lugs and at its lower end a horizontally extending keeper arm, the outer end of the latter being bent upwardly and its extremity bent laterally and downwardly to provide a hook, a lever fulcrumed at one end between said spaced bearing lugs and having its other end formed with a handle and its intermediate portion adapted to engage said hook and formed with a longitudinal series of apertures, a loop-shaped link arranged upon the post and having at one end a hook to engage the loop on the upright and at its other end spaced apertured arms engaged with the opposite sides of said lever, and a pivot pin passed through said apertured arms and one of the apertures in the lever to adjustably pivot the link upon the latter, substantially as shown and described.

In testimony whereof I hereunto affix my signature in the presence of two witnesses.

JOHN POSTLE.

Witnesses:
HARRY LYNN,
RUFUS G. WAGNER.